(12) United States Patent
Suh et al.

(10) Patent No.: US 8,871,074 B2
(45) Date of Patent: Oct. 28, 2014

(54) METHOD AND APPARATUS FOR PERMEATING FLOW DESALINATION

(75) Inventors: Nam P. Suh, Sudbury, MA (US);
Sang-Gook Kim, Wayland, MA (US);
Taesik Lee, Cambridge, MA (US);
Ishan Barman, Cambridge, MA (US);
Gyunyoung Heo, Suwon-si (KR)

(73) Assignee: Massachusetts Institute of Technology, Cambridge, MA (US)

( * ) Notice: Subject to any disclaimer, the term of this patent is extended or adjusted under 35 U.S.C. 154(b) by 530 days.

(21) Appl. No.: 12/002,664

(22) Filed: Dec. 19, 2007

(65) Prior Publication Data
US 2011/0247937 A1    Oct. 13, 2011

(51) Int. Cl.
*C02F 1/46*     (2006.01)
*C02F 1/469*    (2006.01)
*C02F 1/461*    (2006.01)
*C02F 103/08*   (2006.01)

(52) U.S. Cl.
CPC ........... *C02F 1/4691* (2013.01); *C02F 2209/40* (2013.01); *C02F 2001/46161* (2013.01); *C02F 2209/005* (2013.01); *C02F 2103/08* (2013.01); *C02F 2305/08* (2013.01); *C02F 2001/46133* (2013.01)
USPC ........... 204/674; 204/554; 204/660; 205/742; 205/788

(58) Field of Classification Search
CPC ............. B01D 61/44; C02F 1/44; C02F 1/48; C02F 1/4602; C02F 1/4604; C02F 1/4691; C02F 2103/08; C02F 2001/46161; C02F 2305/08; C02F 2209/40; C02F 2001/46133; C02F 2209/005
USPC ......... 204/518, 519, 542, 628, 648, 661, 529, 204/600, 520, 522, 551, 647, 554, 660, 204/674; 210/95.1–195.3, 541, 656, 198.2, 210/243
See application file for complete search history.

(56) References Cited

U.S. PATENT DOCUMENTS

| | | | |
|---|---|---|---|
| 5,192,432 A | 3/1993 | Andelman |
| 5,196,115 A | 3/1993 | Andelman |
| 5,200,068 A | 4/1993 | Andelman |
| 5,360,540 A | 11/1994 | Andelman |
| 5,415,768 A | 5/1995 | Andelman |
| 5,425,858 A | 6/1995 | Farmer |
| 5,538,611 A | 7/1996 | Otowa |
| 5,547,581 A | 8/1996 | Andelman |

(Continued)

FOREIGN PATENT DOCUMENTS

WO    WO 2005/069927    *    8/2005

OTHER PUBLICATIONS

Jung et al. (Desalination 216, 2007, 377-385).*

(Continued)

*Primary Examiner* — Luan Van
*Assistant Examiner* — Steven Rosenwald
(74) *Attorney, Agent, or Firm* — Modern Times Legal; Robert J. Sayre

(57) ABSTRACT

A water desalination system and method in accordance with the principles of the present invention employs capacitive deionization to remove ions from source water to produce deionzed and waste water. The process employs charged electrodes to attract ions of opposite polarity from the source water. The process of discharging the electrodes employs solvent drag.

17 Claims, 16 Drawing Sheets

For Permeating Flow Discharge:

Solute transport model through membrane (non-equilibrium thermodynamics) in conjunction with velocity flow profile for low Reynolds number flow in channel with porous walls.

To solve for:
(a) Velocity profile: Laminar flow in channel with porous walls (classical Berman solution),
(b) Concentration profile:
  1. Inside the channel: Unsteady convection-diffusion with generation and mass transfer at the walls.
  2. Transmembrane transport: Kedem - Katchalsky solute transport equation.

(56) References Cited

U.S. PATENT DOCUMENTS

| | | | |
|---|---|---|---|
| 5,620,597 | A | 4/1997 | Andelman |
| 5,779,891 | A | 7/1998 | Andelman |
| 5,858,199 | A | 1/1999 | Hanak |
| 5,954,937 | A | 9/1999 | Farmer |
| 5,980,718 | A | 11/1999 | Van Konynenburg et al. |
| 6,309,532 | B1 | 10/2001 | Tran et al. |
| 6,580,598 | B2 | 6/2003 | Shiue et al. |
| 6,661,643 | B2 | 12/2003 | Shiue et al. |
| 6,709,560 | B2 | 3/2004 | Andelman |
| 6,781,817 | B2 | 8/2004 | Andelman |
| 6,805,776 | B2 | 10/2004 | Faris |
| 2005/0247631 | A1* | 11/2005 | Queen et al. ............ 210/652 |
| 2006/0049105 | A1* | 3/2006 | Max ....................... 210/650 |
| 2007/0170060 | A1* | 7/2007 | Bourcier et al. ......... 204/518 |
| 2008/0035548 | A1* | 2/2008 | Fan ......................... 210/243 |
| 2008/0198531 | A1* | 8/2008 | Shiue et al. ............. 361/434 |

OTHER PUBLICATIONS

Barman, I., Lee, T., Kim, S.-K., Suh, N.P., "Towards a low cost desalination process: Capacitive deionization with permeating flow discharge", 2007 MIT Manufacturing Summit, Sep. 27, 2007 (poster presentation).*

Chun-Mo, Yang, et al., "Capacitive deionization of NaCl solution with carbon aerogel-silicagel composite electrodes", Desalination, vol. 174, Issue 2 (Apr. 10, 2005), pp. 125-133.

Allison, Robert P., "High water recovery with electrodialysis reversal", Proceedings of 1993 AWWA Membrane Conference (1993), pp. 1-6.

Ryoo, Min-Woong, et al., "Improvement in capacitive deionization function of activated carbon cloth by titania modification", Water Research, vol. 37, Issue 7 (Apr. 2003), pp. 1527-1534.

Christen, Kris, "Desalination technology could clean up wastewater from coal-bed methane production", Environ. Sci. Technol. (Jan. 11, 2006), pp. 1-6.

Welgemoed, Thomas J., "Capacitive deionization technology development and evaluation of an industrial prototype system", University of Pretoria, (2005), pp. 1-90.

CDT Systems, Inc., "Capacitive Deionization Technology", CDT Systems Inc. Technology and Company Overview. (Feb. 21, 2007), pp. 1-32.

Al-Muhtaseb, Shaheen A., et al., "Preparation and Properties of Resorcinol-Formaldehyde Organic and Carbon Gels", Adv. Mater., vol. 15, No. 2 (2003), pp. 101-114.

Dietz, Steven "Improved Electrodes for Capacitive Deionization" (paper), NSF Design, Service and Manufacturing Grantees and Research Conference (2004), pp. 1-5.

* cited by examiner

Assumption:
(1) Flow is incompressible, laminar with no external forces acting on it.
(2) Steady state condition for fluid flow.
(3) Velocity of fluid leaving the channel walls is independent of position $$u\frac{\partial u}{\partial x} + v\frac{\partial u}{\partial y} = -\frac{1}{\rho}\frac{\partial p}{\partial x} + v\left(\frac{\partial^2 u}{\partial x^2} + \frac{\partial^2 u}{\partial y^2}\right) \quad \text{:X-momentum conservation (Navier-Stokes)}$$

$$u\frac{\partial v}{\partial x} + v\frac{\partial v}{\partial y} = -\frac{1}{\rho}\frac{\partial p}{\partial y} + v\left(\frac{\partial^2 v}{\partial x^2} + \frac{\partial^2 v}{\partial y^2}\right) \quad \text{:Y-momentum conservation (Navier-Stokes)}$$

$$\frac{\partial u}{\partial x} + \frac{\partial v}{\partial y} = 0 \quad \text{:Continuity equation}$$

$$\left.\begin{array}{l} u(x, \pm h) = 0 \\ \left(\frac{\partial u}{\partial y}\right)_{y=0} = 0 \\ v(x, 0) = 0 \\ v(x, \pm h) = v_w \end{array}\right\} \text{Boundary conditions}$$

FIG. 6B

| FR \ DP | DP1 Diffusion | DP2 Electromigration |
|---|---|---|
| FR1 Transport ions from bulk to electrode | X | X |
| FR2 Attach (Remove) ions from electrode | 0 | X |
| FR3 Transport ions from electrode to bulk | X | 0 |

Figure 11

| DP<br>FR | DP1<br>Diffusion | DP2<br>Electromigration | DP3<br>Solvent drag |
|---|---|---|---|
| FR1<br>Transport ions from bulk to electrode | X | X | 0 |
| FR2<br>Attach (Remove) ions from electrode | 0 | X | 0 |
| FR3<br>Transport ions from electrode to bulk | x | 0 | X |

Figure 12

METHOD AND APPARATUS FOR PERMEATING FLOW DESALINATION

FIELD OF THE INVENTION

The invention relates to water desalination.

BACKGROUND OF THE INVENTION

"Water, water, everywhere, nor any drop to drink;" Samuel Taylor Coleridge's ancient mariner seems more prophetic with every passing day. Fresh water demand already exceeds supply in many parts of the world, and many more areas are expected to suffer from shortages in the near future. With steadily increasing world population and industrialization, the demand for water is expected to continue rising at an accelerated pace. Yet, at the same time, the depletion of aquifers and increased pollution significantly contribute to a diminution of the supply of fresh water. Nearly the entire southern hemisphere of the earth is expected to suffer water shortages within the next twenty five years. Although currently prohibitively expensive for all but the most critical applications, desalination is expected to play a major role in satisfying the world's critical water needs in the coming years.

Desalination refers to any process that removes dissolved minerals (including but not limited to salt) from seawater, brackish water, or treated wastewater to obtain fresh water for human consumption, irrigation or other industrial applications. Desalination of seawater is common in regions of water scarcity such as the Middle-East, and the Caribbean islands. In other parts of the world, such as the United States, North Africa, Singapore and China, desalination is mostly restricted to brackish water treatment. Desalination is also extensively used in ships, submarines, islands and homes in rural areas where freshwater distribution systems are insufficient to meet the daily needs. The latter also extends to countries where severe lack of infrastructure causes acute water shortfalls despite ample amount of precipitation.

The growing water crisis ranks alongside the problems of shortage of viable energy resources and global warming in terms of its frightening global spread and magnitude. The World Water Development Report by the United Nations delivers the grim prognosis that by the middle of this century, more than 50 nations, constituting a population between 2 to 7 billion, will face a water crisis. Currently, about 7500 desalination plants world-wide already strive to meet current water demands. However, their cumulative contribution is only about 1% of the world's water use. In other words, although the requirement for desalination has been well documented for the past several decades, desalination provides only a tiny fraction of the world's current freshwater needs. The contribution by desalination is so miniscule because the current state of the desalination technology does not support extensive use. One of the primary reasons for this deficiency is the cost. The prohibitive costs associated with the currently-prevailing membrane-based and thermal desalination technologies heavily discourages potential users, unless the local distribution of energy and water resources is significantly skewed in favor of the former, as in the Middle-East. Although membrane related research has helped improve the situation somewhat, particularly for potable water, the greater share of the market, for industrial and agricultural uses, cannot be satisfied with the energy requirements inherent in the processes. The large-scale desalination market is dominated by reverse osmosis (RO), a membrane-based process, and multi-stage flash (MSF), a distillation process. Another process that has been in vogue, since the 1970s, especially for brackish water desalination, is electrodialysis reversal (EDR), a membrane-based process.

In recent years, capacitive deionization (CDI) has been proposed as a solution to some of the crucial issues that have plagued the previous desalination processes, such as energy cost and membrane fouling. The CDI process involves the flow of saline water through, that is between, a pair of high surface area, porous electrodes (e.g. activated carbon cloth) across which a small voltage is applied. During the flow, the ions in the saline water move towards respective electrodes, depending upon the polarity of the ions. Each electrode is able to electrostatically adsorb the ions in a reversible manner. During this charging process, capacitive current flows in the external circuit connecting the electrodes. Consequently, the water flowing out of the system is de-ionized. Once the capacitor, formed by the electrodes, external circuit, and water, is fully charged, the ions are regenerated by shorting the electrodes (or by applying a reverse polarity), thereby flushing the ions absorbed during the charging process by means of waste water through the same flow path. This process is herein referred to as an axial flow discharge process (AFD). The CDI process has been reported to provide nearly an order of magnitude advantage in power requirements over the membrane processes and even the EDR process. This is supported, for example, by tables 2 and 3 of, "Effect of Permation on Discharge Characteristics of Capacitive Deionization Process" by Ishan Barman, submitted to the department of mechanical engineering in partial fulfillment of the requirements or the degree of master of science in mechanical engineering at the Massachusetts Institute of Technology, June 2007, which is hereby incorporated by reference in its entirety.

Although the capacitive process has shown some promise, it is yet to be fully implemented in an industrial setup. The most significant obstacle to full-scale implementation of capacitive deionization systems is the low water recovery ratio characteristic of existing CDI systems. Water recovery ratio is defined as the amount of desalinated water obtained to the total amount of input water. For a given throughput of a desalination plant/process, the water recovery ratio and the power consumption per unit volume of water desalinated provide the two most significant metrics for judging the effectiveness of the plant/process. The power consumption of a desalination process, and attendant cost, is dependent upon, among other factors, the process' water recovery. The costs of pumping and pre- and post-treatment of water, which are greater for low water recovery ratio processes, added to the rising costs of surface water, makes maximizing the recovery ratio a priority. Additionally, because aquifer withdrawals typically surpass aquifer recharge, with resulting drops in water tables, the maximization of water recovery ratio is even more important. In a conventional capacitive deionization process, the discharge typically takes at least half the time required for charging. This has led to typically poor water recovery ratios with the maximum reported being around 0.5-0.6 (for brackish water desalination), as disclosed, for example, in Capacitive Desalination Technology An Alternative Desalination Solution," Desalination, 183, 2-340, 2005, Welgemoed, T. J. Schutte, C. F., and "Desalination Of A Thermal Power Plant Wastewater By Membrane Capacitive Deionization," Desalination 196, 125-134, 2006, Lee, J-B., Park K-K., Eum, H-M., Lee, C-W., which are hereby incorporated by reference in their entirety. By way of comparison, the corresponding recovery ratios for the reverse osmosis and electrodialysis reversal processes for brackish water desalination typically exceed 0.85-0.94. See, for example, "High Water Recovery With Electrodialysis Reversal," Proceedings American Water Works Association Membrane Conference, Baltimore, Md., Aug. 1-4 1993, by Allison, R. P., which is hereby incorporated by reference in its entirety. In addition, the available energy during a conventional capacitive deionization process cycle is not fully utilized, because the system is really operational in two-thirds of the total cycle time one third of the time the system is recharging by flushing accumulated ions from the system's electrodes. Consequently, expensive energy capacity is wasted in a conventional capacitive deionization process. Furthermore, the low water recovery ratio associated with a conventional capacitive deionization process constrains the range of salinity of input water the process can be used for.

Conventional capacitive desalination processes suffer from such shortcomings as, bulk and cost issues, restriction of the discharge process by an axial convection-diffusion mechanism. moving mechanical elements that render the process cumbersome at best. See, for example, U.S. Pat. No. 5,858,199 issued to Hanak and U.S. Pat. No. 6,805,776 issued to Faris, which are hereby incorporated by reference. Additionally, too much water is used for reclamation or regeneration of the electrodes once they are saturated. Attempts to overcome this limitation involve shorting or reverse polarizing the electrodes to regenerate the electrodes. However, reversing polarity may, substitute one problem for another, in that, while ions of one type of charge are repulsed from an electrode, the oppositely charged ions will get immediately attracted to the electrode causing the saturation of the electrode rather than regeneration.

Thus, there is a significant need for the design and development of a process, which, while retaining the energy efficiency of the capacitive deionization process, is able to improve the water recovery ratio substantially such that it can compete with reverse osmosis and EDR for brackish water desalination as well as seawater desalination. It would be desirable that such a process does not entail the use of unnecessary membranes, spacers and such elements that increase power consumption and pressure drops reducing the efficacy of the process. Finally, it should be simple to fabricate or/and assemble the setup. Ideally, existing off-the-shelf parts can be brought together to improve the performance metrics.

SUMMARY

A water desalination system and method in accordance with the principles of the present invention employ a combination of capacitive deionization and solvent drag to, respectively, remove ions from feed water and discharge the accumulated ions. In illustrative embodiments, water is desalinated using capacitive deionization in conjunction with a permeating flow discharge method and apparatus. In such an illustrative embodiment, permeating flow discharge is the method by which solvent drag is employed to accelerate "recharging" of de-ionizing electrodes.

Capacitive deionization involves a process whereby water from which ions are to be removed (referred to hereinafter as "feed water") flows between electrodes to which a potential difference is applied. As the feed water flows between the electrodes, ions within the water are attracted to respective electrodes: negative ions to the positively charged electrode and positive ions to the negatively charged electrode. More ions are removed from the water as it traverses the path between the electrodes, rendering the water purer and purer along the path. At some point, the electrodes between which the water passes become saturated with ions that have been removed from the feed water and adhere to the electrodes. When the electrodes are saturated, the ions adhering to the electrodes are flushed, thereby producing some water with a much higher concentration of ions. The deionized, or "purified," water and brackish, or "concentrated," water are separated; the purified water destined for use in any of a myriad of applications, including agricultural, drinking, industrial, the concentrated water for disposal. Some components of the concentrated water, such as Sodium salt, may find application as well. Additionally, the components of concentrated water may contain precious metals which could be of further use in different applications. This method could thus be employed not only for desalinating brackish or sea water but also for purifying useful metals and such like.

The point at which the electrodes are flushed may be predetermined, on the basis of a time cycle, for example, or ion concentrations may be sensed and used by a controller to determine the time at which to begin and end an electrode-flushing process. In accordance with the principles of the present invention, solvent drag is employed to accelerate the flushing process and to thereby reduce the percentage of time devoted to recharging the system. A smaller percentage of time devoted to recharging the system yields a higher water recovery ratio, a key consideration in desalination systems.

In an illustrative embodiment, feed water is introduced to a channel with electrodes on either side. In this embodiment, the electrodes include a high specific surface area material. Examples of suitable materials include inert carbon-based solids such as an aerogel, porous woven carbon fiber electrodes, nanotubes or other nanostructure. During the desalination process the electrodes will be charged to attract ions to the electrodes. The ions are adsorbed by the high specific surface area material and, eventually, the electrodes become less and less effective at removing ions from the feed water. At a chosen time, which may be predetermined, based upon a predetermined cycle time, or which may be determined by sensing the ion concentration of water purified by the system, the electrodes are recharged using a combination of mechanisms including diffusion and solvent drag. Solvent drag provides for much more effective recharging of the electrodes than conventional diffusion-based recharging.

In an illustrative embodiment, permeating flow discharge is employed to marshal the forces of solvent drag and thereby accelerate the recharging of a system's electrodes. Although permeating flow discharge is employed in illustrative embodiments, other processes and apparatus that are not diffusion-limited in the transport of adsorbed ions from a capacitive deionization system's electrodes are contemplated within the scope of the invention. In permeating flow discharge, the waste water is permeated through porous electrodes rather than allowing the waste water to flow between the electrodes, as in a conventional, axial flow discharge process. By permeating the waste water through porous electrodes, the novel permeating flow discharge process employs solvent drag to increase the rate of ion-removal over the rate offered by the conventional diffusion limited axial flow discharge process. As a result, the new permeating flow discharge process is able to completely clear the electrode surfaces of all ions (or a given number of moles) in a much smaller time interval than required for the axial flow discharge process. Because less water is used up in one pass for discharging, the permeating flow discharge process can provide a higher water recovery ratio than a conventional, axial flow discharge process. A desalination system and method in accordance with the principles of the present invention would be particularly well-suited to would like to extracting ultra-pure water from fairly clean water as done for use in the semiconductor industry. Additionally, a deionization system and method in accordance with the principles of the present invention is particularly well suited to a process for the formation of concentrated solutions of precious metals from dilute aqueous solution containing the metal(s) in its ionic form. The process herein guarantees that the extraction is rapid due to the solvent drag phenomena. Thus not only is purified water collected through the middle channel one can also obtain highly concentrated ionic solutions of precious and other hard to obtain metals in concentrated solutions in the discharge fluid. This can be placed in a conventional electrolysis setup to extract the precious metals. Without this process, an extremely dilute solution of the metal ions would take hour and possibly days to extract small quantities of the metal.

BRIEF DESCRIPTION OF THE DRAWINGS

The above and further features, aspects, and advantages of the invention will be apparent to those skilled in the art from the following detailed description, taken together with the accompanying drawings in which:

FIGS. 11 and 12 illustrate the decoupling of the desalination process in accordance with the principles of the present invention;

DETAILED DESCRIPTION

Figure 1:
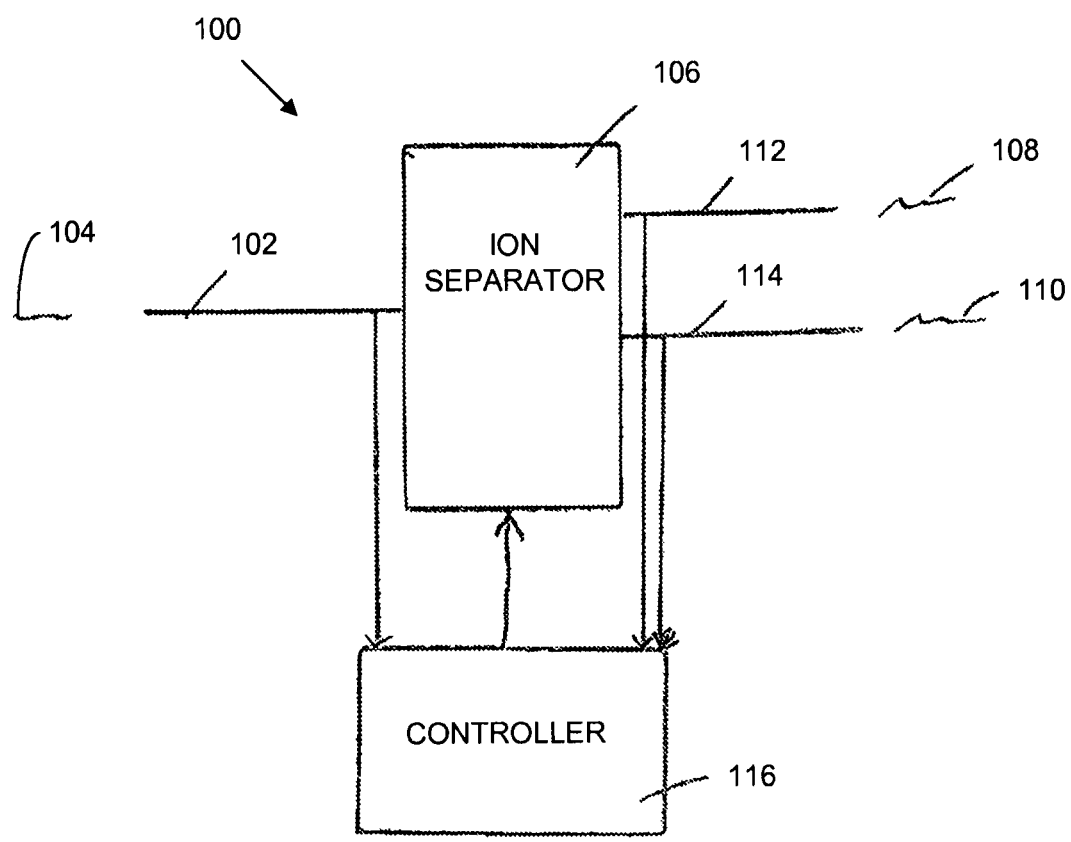
FIG. 1 is a conceptual block diagram of a desalination system in accordance with the principles of the present invention.

A water desalination system and method in accordance with the principles of the present invention, as generally illustrated in the conceptual block diagram of FIG. 1, employs capacitive deionization to remove ions from feed water (also referred to herein as source water) and solvent drag to discharge the accumulated ions into waste water. In illustrative embodiments described below, water is desalinated using capacitive deionization in concert with a solvent drag discharge method and apparatus. In an illustrative embodiment, a permeating flow discharge method and apparatus are employed to utilize solvent drag and thereby accelerate discharge of ions from the ion separator.

Capacitive deionization involves a process whereby water from which ions are to be removed (referred to hereinafter as "feed water") flows between electrodes to which an electrical potential difference is applied. As the feed water flows between the electrodes, ions within the water are attracted and adsorbed to the respective electrodes: negative ions to the positively charged electrode and positive ions to the negatively charged electrode. More ions are removed from the water as it traverses the path between the electrodes, rendering the water purer and purer along the path. At some point, the electrodes between which the water passes become saturated with ions that have been removed from the feed water and adhere to the electrodes. When the electrodes are saturated, the ions adhering to the electrodes are flushed, thereby producing water with a much higher concentration of ions. The deionized, or "purified," water and waste, or "concentrated," water are separated; the purified water destined for use in any of a myriad of applications, including agricultural, drinking, industrial, the concentrated water for disposal. Some components of the concentrated water, such as sodium salts and noble metals, may find application as well.

In the conceptual block diagram of FIG. 1 the system 100 includes an inlet 102 for feed water 104. The feed water 104 carries dissolved ions, typically including sodium and chloride ions, for example, in the case of seawater or brackish water. The concentration of ions may vary widely, but, as is described in the discussion below, the range of ion concentration for efficient operation may be in the range of 1000-30000 ppm. The feed water 104 enters the system 100 through the inlet 102 and is introduced to an ion separator 106. The ion separator 106 produces treated water 108, that has a lower concentration of ions than the feed water 104, and waste water 110, that has a higher concentration of ions than the feed water, at respective outlets 112 and 114. The total volume of the treated water 108 and waste water 110 produced at the outlets 112 and 114 equals the volume of the feed water 104 received at the inlet 102. As is described in more detail in the discussion below, in the ion separator 106 ions from the feed water 104 are electrostatically adsorbed by electrodes to reduce the ion concentration in the and thereby produce treated water 108. The ion separator transfers ions adsorbed from the feed water 104 to the waste water 110. The ion separator 106 may include one or more conduits, such as pipes or channels for example, that provide for the separation of feed water 104, treated water 108 and waste water 114. A controller 116 monitors the concentration from the various input and output streams (e.g., flow rate, ion concentration, etc.) and provides control signals to the ion separator 106 in response to those readings.

In accordance with the principles of the present invention, the ion separator 106 employs electrostatic adsorption to remove ions from an input stream. The ion separator then uses an ion transport system and method in which solvent drag, not ion diffusion, is the dominant transport method to remove the ions electrostatically adsorbed by electrodes during the charging process. The solvent drag transport method, which operates much more effectively than a diffusion only process, may be employed, for example, by permeating the ions through the pores of one or more permeable electrodes. By permeating the waste water through porous electrodes, solvent drag substantially increases the rate of ion-removal when compared to the rate offered by a conventional diffusion limited process, such as the axial flow discharge process. As a result, the new permeating flow discharge process is able to completely clear the electrode surfaces of all ions (or a given number of moles) in a much shorter period of time than required for a conventional diffusion limited process. Because less water is required to discharge the capacitive deionization system's electrodes, a system and method in accordance with the principles of the present invention that employs a solvent drag discharge process (permeating flow in an illustrative embodiment) can provide a higher water recovery ratio than a conventional axial flow discharge process. It is important to note that this approach does not sacrifice the power consumption advantage possessed by the conventional CDI processes, because the porosity of the electrodes allows water to be permeated without requiring a large pressure differential. Porosity of greater than 50% and minimal power penalties are discussed in greater detail in the thesis by Ishan Barman, previously incorporated by reference herein.

Figure 2:
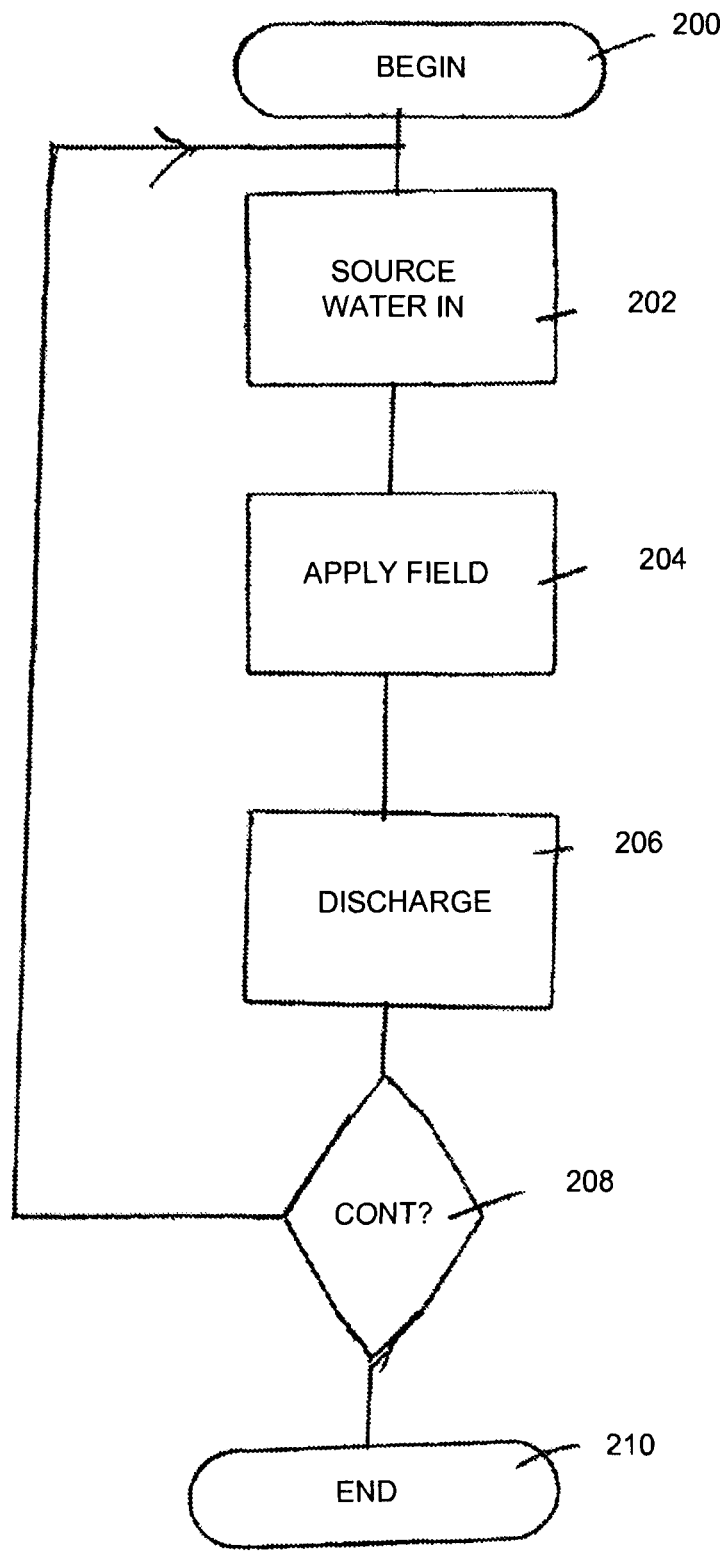
FIG. 2 is a flow chart depicting a desalination process in accordance with the principles of the present invention.

The flow chart of FIG. 2 depicts the basic steps of desalination in accordance with the principles of the present invention. The process begins in step 200 and proceeds from there to step 202 where feed water is brought into the desalination system. From step 202 the process proceeds to step 204 where a voltage is applied to electrodes, thereby attracting ions from the source water to the electrodes, with positive ions attracted to the negatively charged electrode and negative ions attracted to the positively charged electrode. In an illustrative embodiment in accordance with the principles of the present invention, the electrodes include a high specific surface area material such as inert carbon-based solids such as an aerogel, porous woven carbon fiber sheets, nanotubes or other nanostructure When the electrodes are charged to attract ions to the electrodes, ions within the source water 104 are adsorbed by the high specific surface area material, thereby eliminating the ions from the source water 104 and producing desalinated water 108. The desalinated water 108 flows to the output 112 for any of a variety of uses. Eventually, as more and more ions are adsorbed to the surface of the electrodes of the ion separator 106, the electrodes become less and less effective at removing ions from the feed water (e.g. more and more saturated). Putting it another way, it can be said that with passing time less surface area is left on the electrodes to which the ions present in the saline water can adhere. Once the electrodes reach a predetermined level of ion saturation they must be discharged in step 206 (i.e. cleaned) in order for the desalination process to proceed in an efficient manner. The level of saturation at which discharging is begun may be determined empirically in order to optimize the process according to various system parameters, such as input ion concentration, acceptable levels of output ion concentration, energy costs, etc. Typically one will start discharging the ions as soon as the water in stream 108 breaches the concentration threshold acceptable for consumption based on the specific application area. The time at which the discharge step 206 is entered may be be predetermined based upon a predetermined cycle time, may be determined by sensing the ion concentration of water purified by the system, may be determined by a sensing mechanism that determines the degree to which the high effective surface area electrodes have become saturated with adsorbed ions, or may be determined by another measure of the diminished effectiveness of the desalination process, for example. In accordance with the principles of the present invention, the electrodes are recharged (that is, ions are discharged) using a combination of mechanisms including diffusion and solvent drag. Solvent drag provides for much more effective recharging of the electrodes than simple diffusion. During the recharging (recharging of the electrodes, discharging of the capacitor formed by the water, electrodes and external circuit) the electrodes may be "shorted" (that is, the potential difference between them brought to zero), reverse polarity may be applied, or a combination of shorting and reverse polarity may be employed to remove the electromagnetic attraction between electrodes and ions. When the electrodes are sufficiently recharged, the process proceeds to step 208. Sensing techniques similar to those described in connection with the onset of the discharging step 206 may be employed to determine when the electrodes are sufficiently recharged and to proceed to step 208.

In step 208 the determination is made whether to continue the desalination process. This determination may be made, for example, by a controller 116 that is a part of the system 100. If the desalination process is to be terminated, the process proceeds to end in step 210. The process may terminate in this fashion, for example, to shut the desalination system down for maintenance. If, on the other hand, the determination is made to continue the desalination process, the process returns to step 202 and proceeds from there as previously described. Although this discussion of a process in accordance with the principles of the present invention presented the method and apparatus in a sequential fashion, corresponding to a batch process, a continuous process is also contemplated within the scope of the present invention.

That is, in a batch process, a treatment method and apparatus in accordance with the principles of the present invention may bring source water in to a treatment facility, to a holding vessel, such as a tank or pipe, for example, then turn off the flow of source water to that particular holding vessel. The water is then purified by capacitive deionization and purified water is discharged. During the purification process electrodes become saturated. Some of the source water is employed to discharge the electrodes, using both diffusion and solvent drag mechanisms. The water employed in this electrode cleansings step is discharged as waste water to the waste water outlet 114 for disposal. In an illustrative embodiment, water is permeated through the electrodes to harness the added force of solvent drag to remove ions from the electrodes. Once the electrodes are cleansed of ions, the process may repeat with the introduction of more source water to the water treatment facility. The degree to which the electrodes are cleansed, or flushed, is an implementation decision that may be adjusted to optimize the water recovery ratio for a given required ion concentration in the purified water. Of course, the degree to which electrodes are flushed in each pass will have a significant impact on a system's water recovery ratio.

In a continuous implementation in accordance with the principles of the present invention, water may be introduced to one or more channels between electrodes that de-ionize the source water as just described. When the electrodes have reached a saturation point, water is permeated through the electrodes flush the adsorbed ions from the electrodes. The permeation may be accomplished by increasing the water pressure within a central channel to induce a pressure gradient that forces water through permeable electrodes to waste water channels outside the central channel to be disposed of in the waste water outlet 114. In a continuous embodiment such as this, source water continues to flow through the system and, depending upon the saturation level of the electrodes, is either deionized as it flows along the length of the channel or is employed to flush the electrodes of accumulated ions through a permeating flow process. In another continuous embodiment, the water may be introduced to a set of three or more tubes with an annular tube playing the role of a central channel and the central tube, along with other annular tubes, used as conduits for the waste water.

Figure 3:
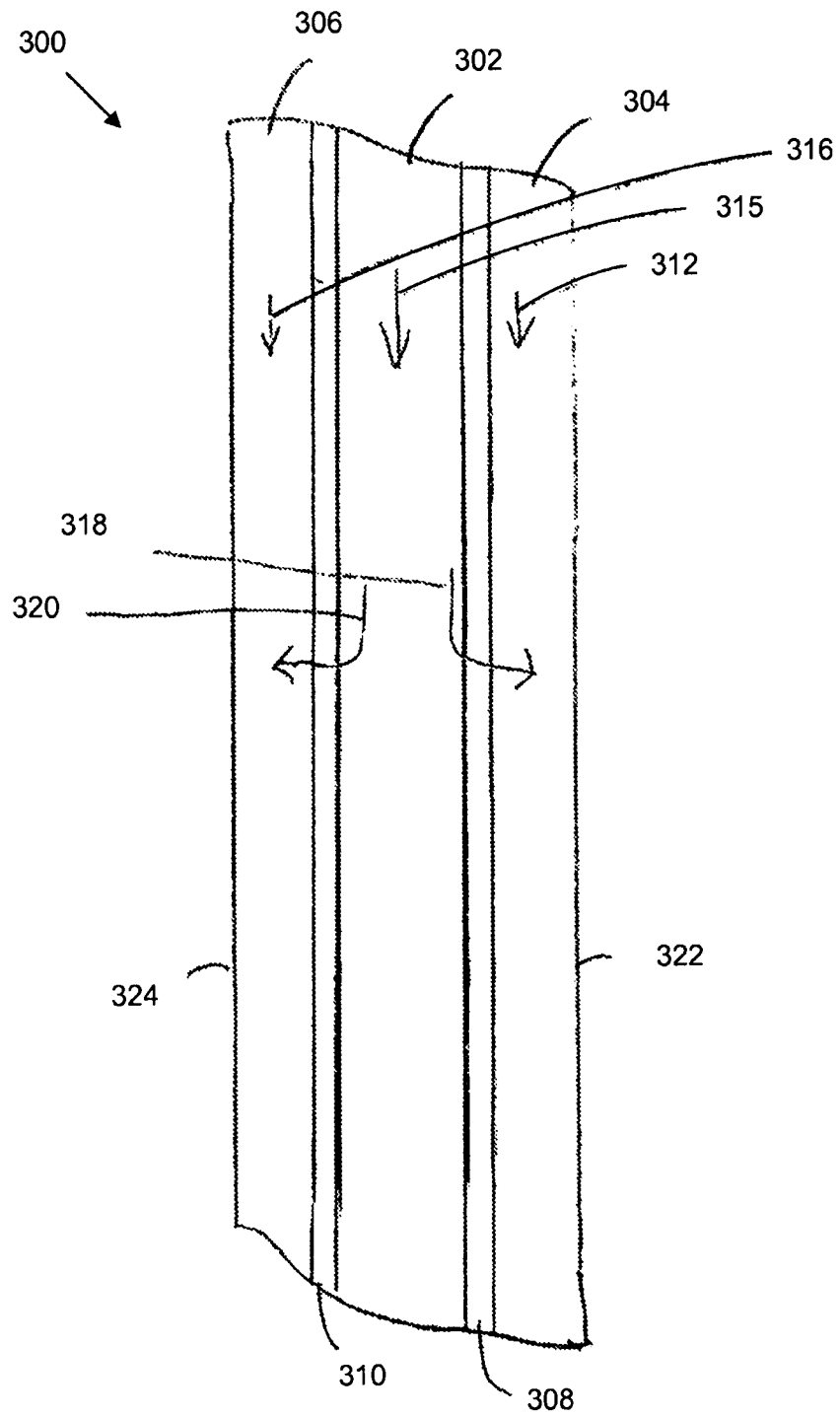
FIG. 3 is sectional view of a desalination system in accordance with the principles of the present invention.

In the conceptual representation of FIG. 3 a non-diffusion limited capacitive desalination system in accordance with the principles of the present invention employs permeating flow to introduce solvent drag into the electrode recharging process. As previously described, by avoiding diffusion-limited recharging of the electrodes, that is, employing an ion transport mechanism in addition to or in substitution for diffusion for discharging adsorbed ions from the electrodes, a system and method in accordance with the principles of the present invention improves a capacitive deionization system's water recovery ratio, making such a system more efficient and practicable for a greater range of water purification applications. In accordance with the principles of the present invention, in this permeating flow implementation, a central channel 302 is formed between permeable electrodes 308 and 310. The electrodes are preferably composed of a material having high surface area-to-volume ratio, high electrical conductivity and high ion permeability. In an illustrative embodiment, the electrodes 308 and 310 are composed of carbon aerogel having a surface area-to-volume ratio of at least 60,000 to 1, a specific surface area of 500 $m^2/g$, a density of 0.6 $g/cm^3$, a bulk resistivity of 20 milliohm/cm and a specific capacitance of greater than 2 Farad/$cm^2$. Although the electrodes employ carbon aerogel in this illustrative embodiment, electrodes made of other materials, including carbon nanotubes, are contemplated within the scope of this invention. Outer channels 304, 306 are formed between the electrode 308, 310 and the exterior walls 322, 324. In an illustrative embodiment, the channels 302,304,306 are linear "trench" channels and source water flows through all three channels.

During the charging period a voltage in the range of 1.17V to 1.3 V is applied across the electrodes 308 and 310, source water flows through the channels in the direction indicated, the pressure within all the channels is approximately equal, and ions from water in the central channel 302 is adsorbed to the electrodes 308 and 310. Once the electrodes are fully charged, the potential across the electrodes is adjusted, and the water pressure within the central channel 302 is increased relative to the pressure in the outer channels 304,306 (pressure in the outer channels could just as well be decreased). The adjustment of the electrode potential substantially eliminates electrical forces holding the ions in place and the relative increase in water pressure within the central channel forces water from the central channel through the electrodes, thereby employing solvent drag to move the ions from the electrodes into the outer channels. In accordance with the principles of the present invention, the potential across the electrodes 308, 310 could be adjusted in a number of ways to promote the release of ions, with the potential brought to ground or reversed, for example. During the discharging period, water within the central channel will remain purified and available for delivery to the pure water outlet, so long as the discharge period is not excessive. That is, so long as the channels are long enough that water arriving at the beginning of the electrode discharge process does not flow so far down the channels that there is insufficient channel length to de-ionize it once the electrode discharge process is complete, water in the central channel may always be routed to a pure water outlet. Water from the outer channels, which is there to carry excess ions away, is always routed to the waste water outlet. Rather than using source water in the outer channels, waste water that does not have too high of an ion concentration may be recycled and used to transportions along the outer channels. The recycling of concentrated water reduces the ratio of purified water to waste water thereby increasing the water recovery ratio. This step, while outlined for this specific embodiment, is generically applicable to all other designs described herein. It is important to note that the number of times water can be recycled in a permeating flow discharge process is significantly higher than that in an axial flow discharge process. In the latter case, if the regenerating fluid is too concentrated the ions "floating" near the electrodes do not have a favorable concentration gradient along which they can move. In contrast, for the permeating flow discharge case, the concentration of waste water has no significant impact on its ability to remove more ions.

As previously described, the determination of "fully charged" may be made in a variety of ways. For example, measurements may be made during the charging process and, when the ion concentration in the electrodes reaches a trigger level, the electrodes are discharged. Alternatively, the charging process may run for a predetermined period of time, followed by discharging. The predetermined period of time may be selected empirically based on previous operation under similar operating conditions, for example. These and other methods of determining the level at which the electrodes are discharged are contemplated within the scope of the present invention. Diffusion transport still takes place in this system, but diffusion here in either direction—through the electrode to the outer channels or into the middle channel water (as in AFD)—is a much less significant ion transport factor. A simple scaling analysis reveals that the ratio of the solvent drag to the diffusion terms is governed by the permeation rate, diffusion characteristics of the ion in water, and the material properties of the porous electrode and for almost all feasible flow rates is dominated by the permeating term.

By employing processes beyond simply diffusion for recharging the electrode, in this illustrative embodiment permeating the waste water through porous electrodes, the new discharge process (permeating flow discharge process in this example) employs solvent drag to increase the rate of ion-removal over the rate offered by the conventional diffusion limited axial flow discharge process. As a result, the new permeating flow discharge process is able to completely clear the electrode surfaces of all ions (or a given number of moles) in a much smaller time interval than required for the axial flow discharge process. Because less water is used up in one pass for discharging, the permeating flow discharge process can provide a higher water recovery ratio than a conventional, axial flow discharge process.

Figure 4:
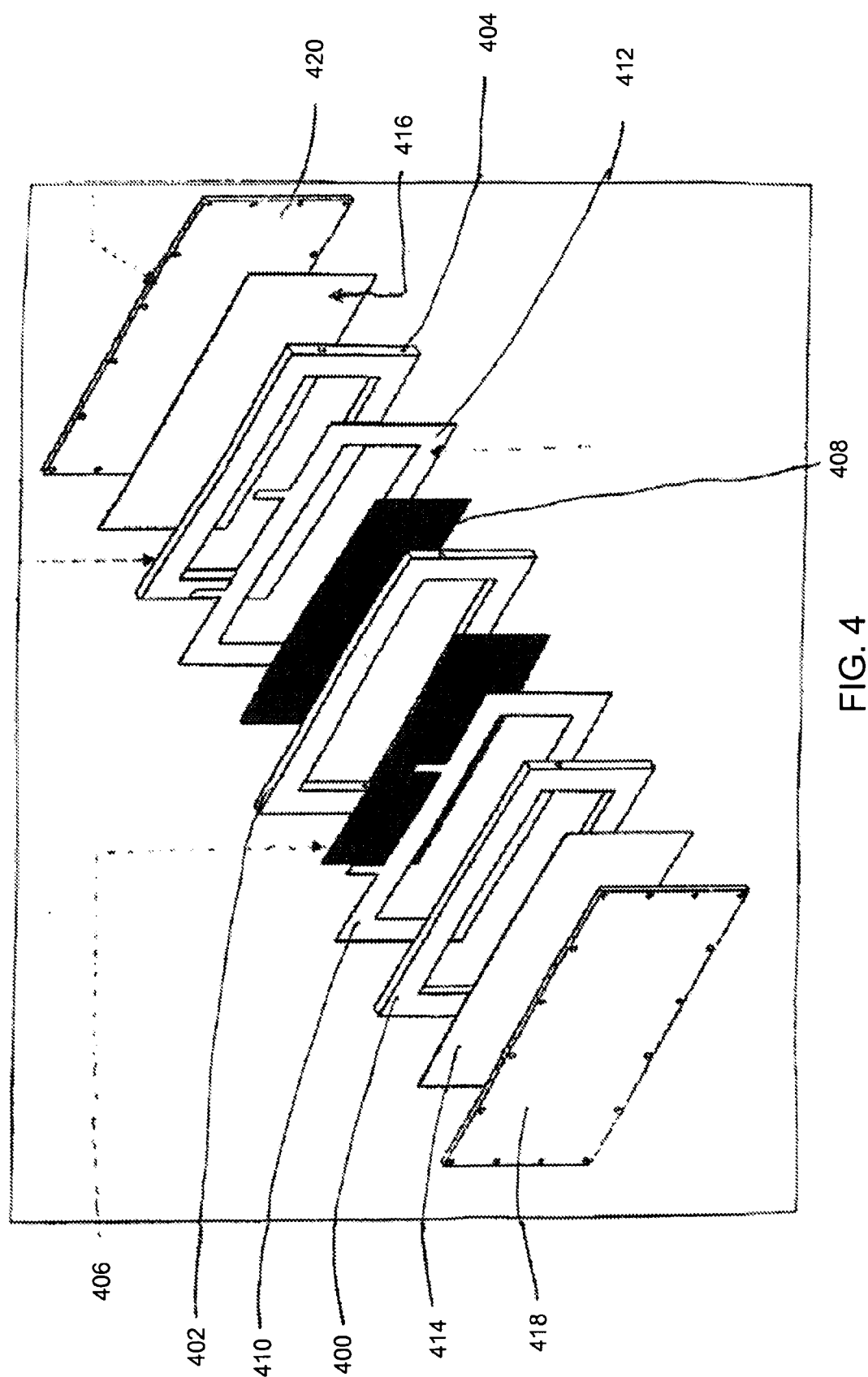
FIG. 4 is an exploded view of a desalination system in accordance with the principles of the present invention.

FIG. 4 is an exploded view of a benchtop model of a permeating flow capacitive deionization system in accordance with the principles of the present invention that was used to test the water recovery ratio of a system in accordance with the principles of the present invention. In this illustrative embodiment, polypropylene plates 400, 402, 404 provide space for a first outside, a central, and a second outside channel respectively. Apertures in the plates provide means for water ingress and egress. Carbon aerogel sheets 406, 408 are employed as capacitive electrodes and a potential is supplied to the electrodes through contact with aluminum foil contacts 410, 412. Rubber gaskets 414, 416 seal the system and polypropylene plates 418, 420 retain and compress the module.

Figure 5:
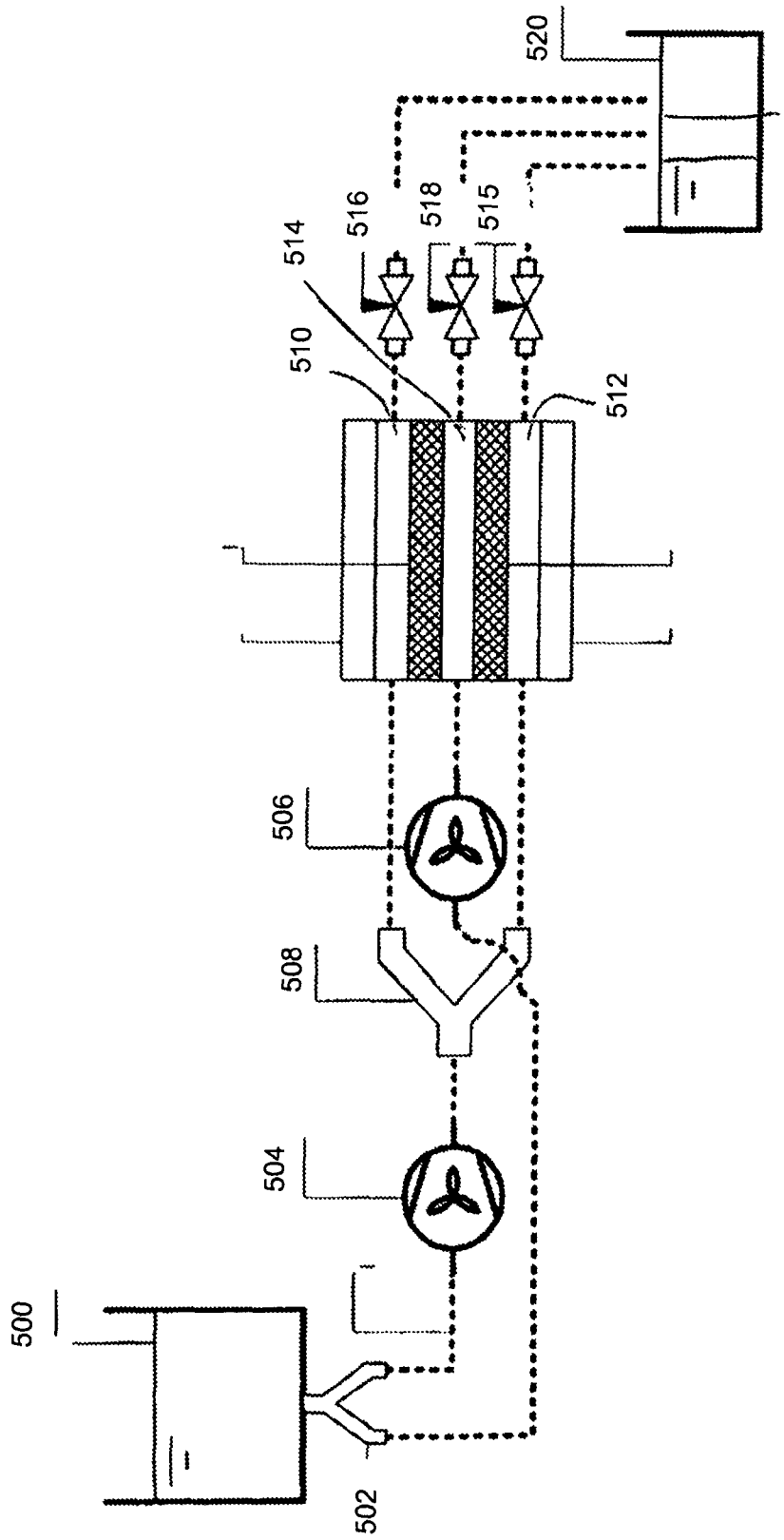
FIG. 5 is a schematic diagram of a desalination system in accordance with the principles of the present invention.

FIG. 5 is a schematic diagram of the fluidic circuit for the bench model of FIG. 4. Source water is supplied from a reservoir 500 to a wye 502 which divides flow between two peristaltic pumps 504, 506. Source water from peristaltic pump 504 is divided by a wye 508 between the two outside channels 510,512. Peristaltic pump 506 delivers source water to the central channel 514. Valves 515, 516, 518 control flow from their respective associated channels to a collector 520 that maintains the separation between waste and purified water. Operation of the system is as previously described.

Figure 6A:
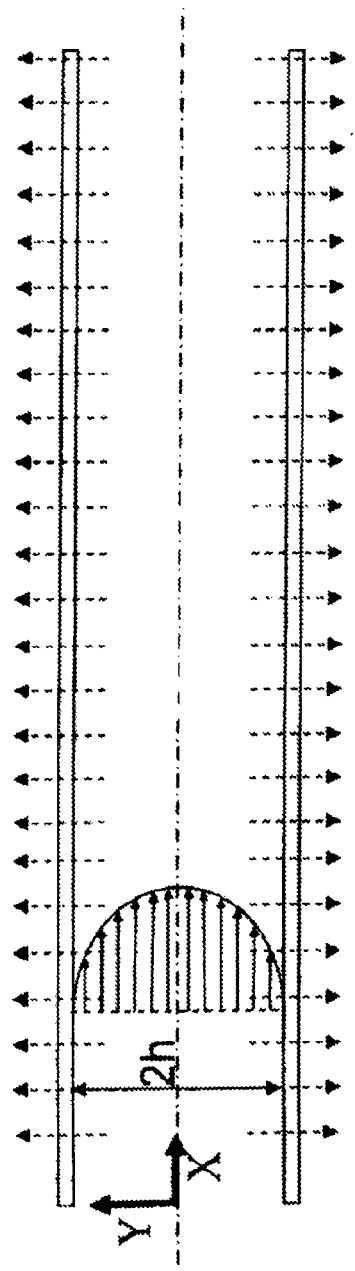
FIGS. 6A is and 6B depict flow velocity in a desalination system in accordance with the principles of the present invention.
Figure 7A:
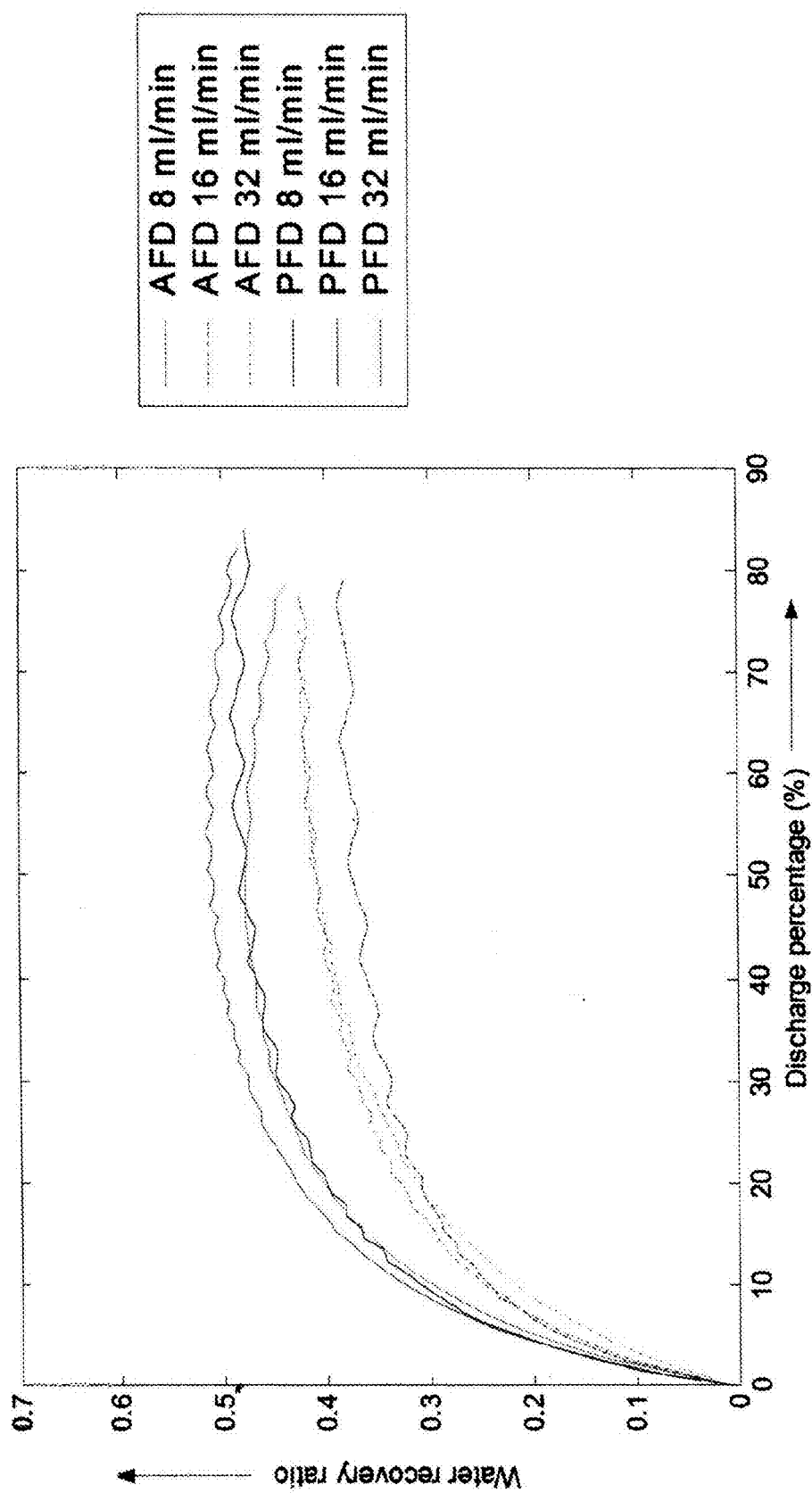
FIGS. 7A and 7B plot water recovery ratios for axial flow and permeating flow discharge capacitive desalination systems.
Figure 7B:
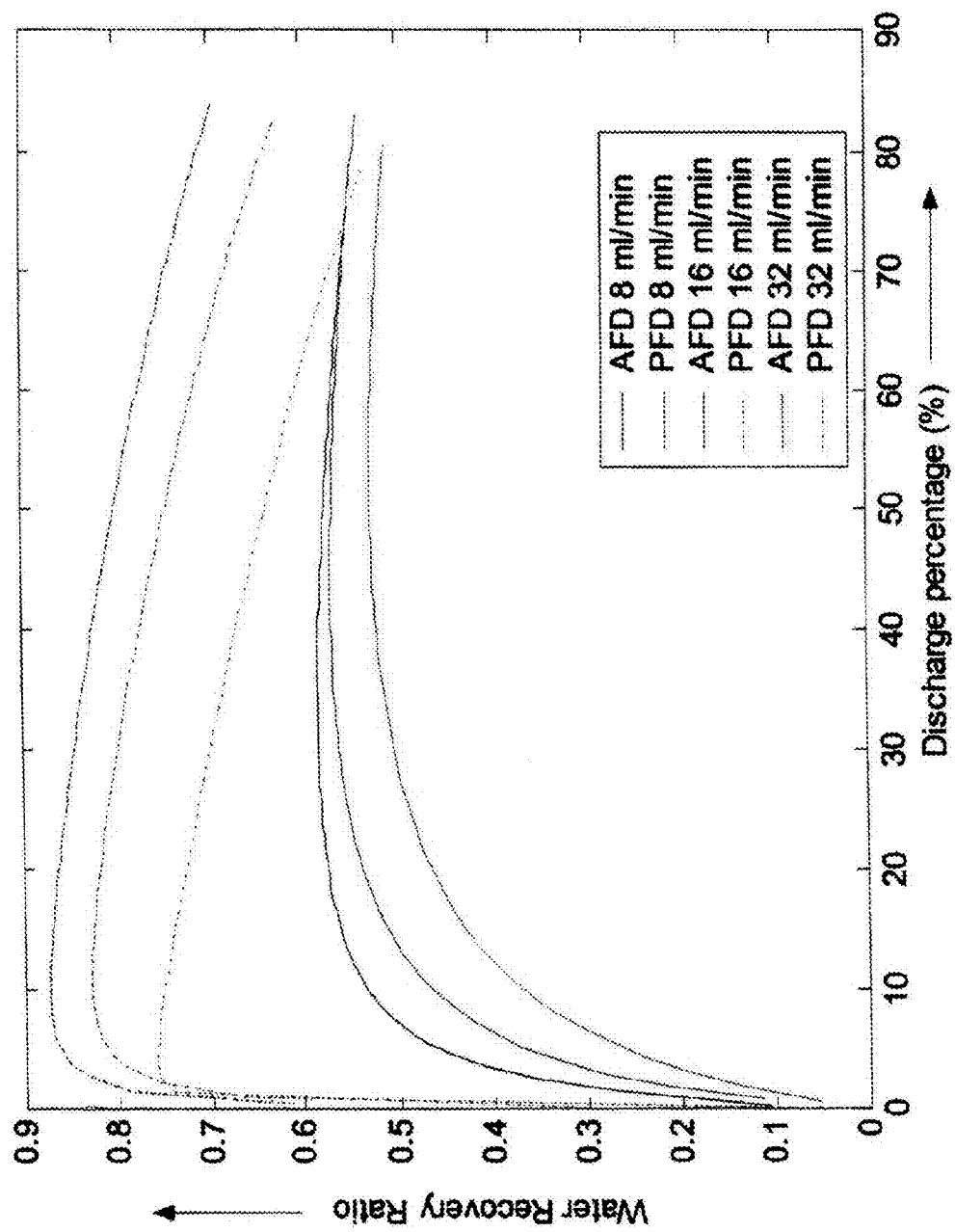

FIGS. 6A and 6B display, respectively, the theoretical model and velocity profile equations for a permeating flow capacitive deionization system in accordance with the principles of the present invention. Concentration governing equations are included in the thesis of Ishan Barman, previously incorporated by reference. FIGS. 7A and 7B plot water recovery ratio versus discharge percentage for various flow rates comparing the illustrative permeating flow discharge system to a conventional axial flow discharge system. As illustrated, water recovery ratios are significantly higher using a permeating flow discharge capacitive deionization system in accordance with the principles of the present invention.

Figure 8:
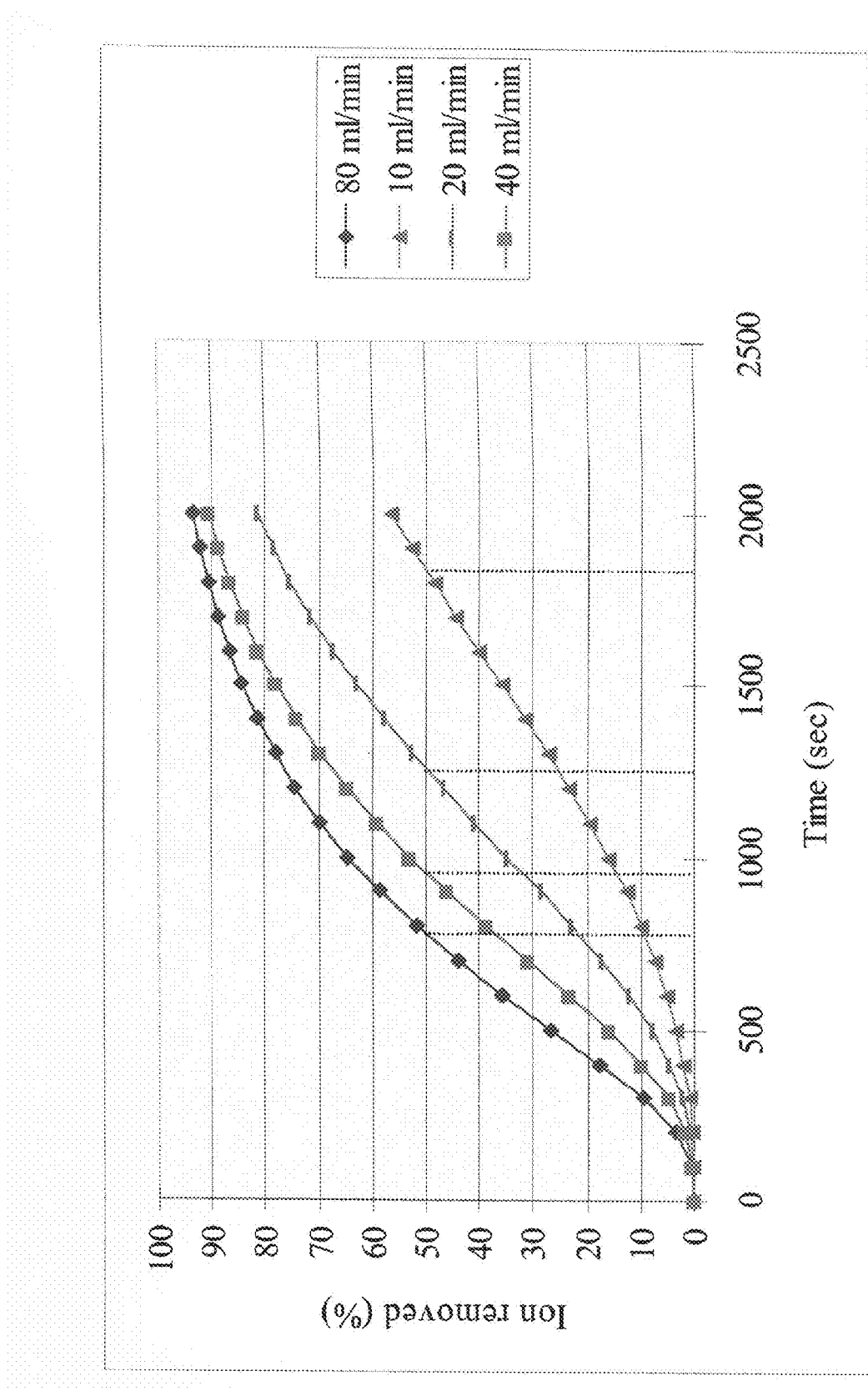
FIG. 8 plots the percentage of ions removed versus time for various flow rates.

In FIG. 8 for all the flow rates, there is an initial diffusion lag followed by rapid ion transfer phenomenon. The period of lag depends on the axial velocity of water in the channel—as may be expected increased axial velocity increases the rate of ion transfer. For the higher flow rates, we are also able to observe a slight leveling out of the cumulative ion transfer curve towards the end of the time scale because most of the ions (~90%) in the capacitive electrodes have been removed by this time, i.e. there in very little influx of ions from the wall of the channels. Another interesting feature of FIG. 8 is that, although increasing the flow rate seems to increase the rate of ion transfer out of the system, a closer look reveals that as we continue to increase the flow rate above a certain threshold the visible gains in ion transfer rate are diminished. In other words, the difference at any time between the 20 and 40 ml/min curves is substantially larger than that between the 40 and 80 ml/min curves.

Figure 9:
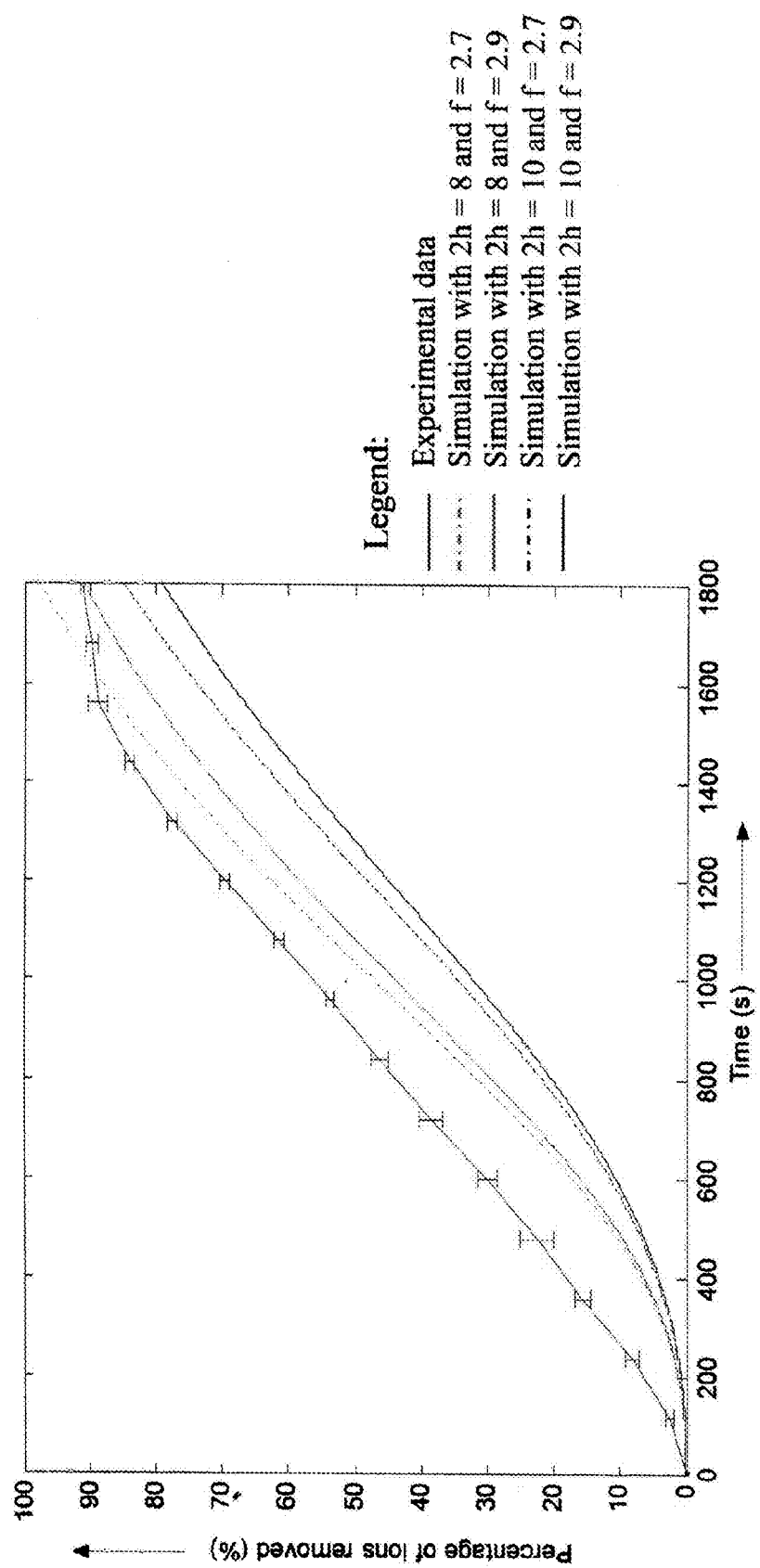
FIGS. 9 and 10 plot percentage of ions removed versus time for experimental data and simulations.

FIG. 9 is a plot of the percentage of ions removed as a function of time using an axial flow discharge process. "2h" refers to the distance between electrodes and f is the effective volume. In three time constants a capacitor should discharge approximately 95% of its accumulated charge, The initial progress is fairly slow because diffusion phenomenon requires a certain amount of time to transfer detached ions from the surface of the porous electrode to the bulk of the channel. This is delay is often referred to as the characteristic time lag for a diffusion process. Moreover, the axial flow velocity is maximum at the channel center and zero at the electrode surfaces. As a result, the convection process cannot flush out the ions until the diffusion process is able to transfer ions from the electrode surface towards the bulk. Furthermore, the initial concentration of detached ions at the electrode surface is not very high, which means that there is no overpowering concentration gradient to accelerate the diffusion process. The electrode surface concentration rapidly picks up, creating a sufficiently high concentration gradient in the lateral direction. As a consequence, the process speeds up because diffusion is able to transfer ions to the bulk, on time scales longer than the lag time and the convective flow is able to carry away ions that have moved away from the electrode surface.

Figure 10:
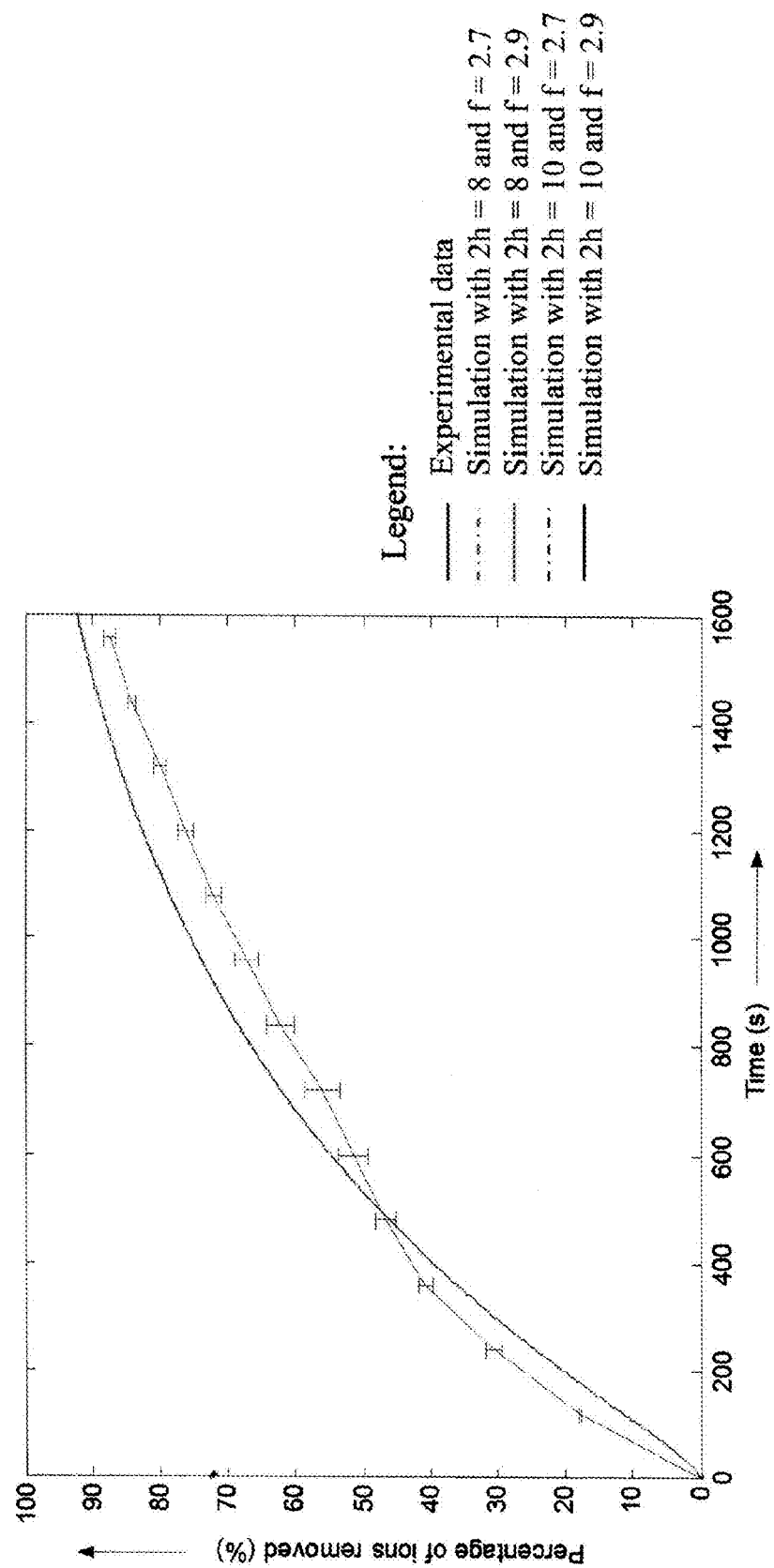

FIG. 10 is a plot of percentage ions removed as a function of time for a permeating flow discharge process at a flow rate of 16 ml/min. "2h" refers to the distance between electrodes and f is the effective volume. FIG. 10 shows the percentage of ions removed by the permeating flow discharge process as a function of time. Before we proceed further, it must be stated that for our experiments as well as in our simulations, we considered the middle channel valve to be completely closed. This forced all the water to permeate through the aerogel electrodes. In some sense, therefore, it would be fair to call this the opposite end of the spectrum with respect to the AFD process. If the middle channel valve was only partially closed one could obtain a mixture of middle channel outlet and permeating flow which would represent some zone in the middle of the spectrum, to extend the previous analogy. Another point that needs clarification is the choice of the Y-axis not only in FIG. 10, but also in subsequent PFD process graphs. The percentage value is chosen as a more appropriate representation of the trend rather than the absolute value which could be misleading as one moves from the AFD to the PFD process, because the charging processes yields different number of adsorbed ions in the two distinct setups. In other words, the Y-axis value is a normalized value, where the normalization factor is the number of ions released in three time constants (~95% of total ions adsorbed in the setup).

The first thing we notice in FIG. 10 is the distinctly different shape of the percentage of ions removed plot obtained for the PFD process as compared to that obtained for the AFD process in FIG. 9. It spells out the obvious difference in the underlying physics of the two discharging processes. No characteristic lag can be observed in either the experimental plots or the theoretical predictions. The permeating flow discharge process removes the ions through the porous electrodes in two different ways. The first contribution comes from the solvent drag term, where the amount of ion removal is directly proportional to the concentration on the electrode surface as per a modified Kedem-Katchalsky equation. The second contribution is from the diffusive flux that arises due to the concentration difference across the electrodes. The lack of the characteristic lag time is because both the solvent drag and diffusion across the electrode respond to the build-up of concentration at the electrode surface. The profile here mirrors the plot of cumulative ions detached from the EDL of the aerogel electrode versus time. Depending on the concentration at the electrode, the solvent is able to drag a proportional number of ions along with the flow. Thus, there is no lag or build-up time for highest removal rate. In this case, the highest removal rate occurs when the concentration at the electrode is the highest which is, loosely speaking, when the current is maximum. Moreover, once the electrode has been crossed the ion can be considered to having been removed from the system, which is in sharp contrast to the AFD process where the diffusion was an intermediate pathway before the ion was finally flushed out by the convective flow. It is to be noted that in this regard, the solvent drag term is much more effective as it is proportional to the concentration at the electrode surface unlike the diffusive flux term which varies linearly with the difference in concentration across the electrode.

In order to maximize water recovery ratio, we need an optimum flow rate such that the ion transfer is moderately high at that flow rate while the total volume required to take away the ions is not inordinately large. If the first condition is not satisfied then discharge time will be too great and the productivity of the plant with regard to the total amount of water desalinated per day will drop. On the other hand, if the second criterion cannot be fulfilled, it will lead to a very small water recovery ratio, which is unacceptable. This optimization pattern exhibited is a typical characteristic of a coupled design where the required functions have to be compromised upon because they are satisfied by conflicting design parameters. Axiomatic design theory provides us with tools to decouple this design where we are able to independently achieve the objectives. One of the advantages of permeating flow discharge is that it is a decoupled design in which we can use convection through the electrodes to regenerate the electrodes such that using more flow rate does not diminish the returns on ion transfer.

FIG. 11 illustrates the mapping for capacitive deionization with axial flow discharge. There are only two design parameters at the highest level to satisfy the three top-level functional requirements. In a scenario where the number of FRs exceeds the number of DPs, the design becomes 'coupled'. A coupled design does not satisfy the Independence Axiom and consequently successful attainment of design goals becomes an improbable task, if not an impossible one. The capacitive deionization process design involving axial flow discharge is not a desirable solution and one must look to either 'uncouple' or 'decouple' the design. A decoupled design is characterized by a triangular (either upper or lower triangular) design matrix while for an uncoupled design, the design matrix assumes a diagonal form.

It is evident that uncoupled design is the best possible form since each FR is independently satisfied by its corresponding DP (FR1 by DP1, FR2 by DP2 and so on). However, it is not always possible to attain a simple uncoupled form. In such a scenario, a decoupled design works equally effectively as long as the DPs are implemented in the sequence dictated by the triangular form of the design matrix. The easiest way to decouple the design, presented in FIG. 11, is to either add a DP or reduce a FR. However, the reduction of a FR is an unacceptable practice as that would mean the reduction of functionality of the system and consequently an inability of the system to attain its required goals. Thus, our new design should incorporate an additional DP such that the new design is able to satisfy the Independence Axiom. Loosely speaking, the new DP should significantly influence its corresponding FR while having limited or no impact on the other FRs. It is to be noted that this is not a strict requirement but given multiple possible DPs one would like to introduce a DP that follows the above stated guideline.

FIG. 12 illustrates the mapping for capacitive deionization with permeating flow discharge. The new DP introduced by permeation of the waste water through the porous electrodes is called solvent drag. It represents the generic phenomena of ion transport through a membrane (the porous electrode in this case) due to constant solvent flux through the same. In other words, the solute is carried with the solvent as the latter perfuses through the carbon aerogel electrodes. It must be emphasized that the solvent drag phenomena is completely distinct from the diffusion of the ions across the porous electrode due to the concentration difference that exists across it. The solvent drag term and the diffusion term together account for all of the ions transported across the aerogel electrode. The new FR-DP mapping based on the deionization process with the PFD scheme is represented in FIG. 12.

The relative magnitude of the solvent drag, diffusion-across-membrane and internal diffusion terms—where the first two regulate the PFD ion transfer phenomena and the last term accounts for ion transport in the AFD scheme—will determine the effectiveness of the new process. Although it is not imperative to have solvent drag to be substantially higher than diffusive permeation across the aerogel electrode, one could reason that this will probably be true unless the permeation velocity is extremely small. This intuitive prediction forms the basis of the smaller 'x' (denoting smaller influence) in the $1^{st}$ column of the $3^{rd}$ row as compared to the larger 'X' (depicting significant influence) in the $3^{rd}$ column of the same row. Please note that even if this prediction is not valid, the design matrix is decoupled.

What is of far greater consequence, however, is the ratio of the sum of the PFD ion transfer terms to the AFD ion transfer term. For maximum beneficial impact, the former should be much higher than the latter—preferably an order-of-magnitude higher, if not more. In other words, the new scheme will be able to cause a quantum leap in the performance metrics of the capacitive deionization process if and only if the ions that are desorbed from the aerogel electrode are removed much faster with the help of the permeating flow path. The understanding that the ion removal rate is inherently linked to the performance metrics, primarily water recovery ratio and throughput, gives rise to the underlying hypothesis of our work, which can be formally stated in the following manner: The rate of removal of ions from a channel setup is higher for a process that is influenced by solvent drag (PFD) than for one which is diffusion limited (AFD), given the same flow conditions.

Figure 13:
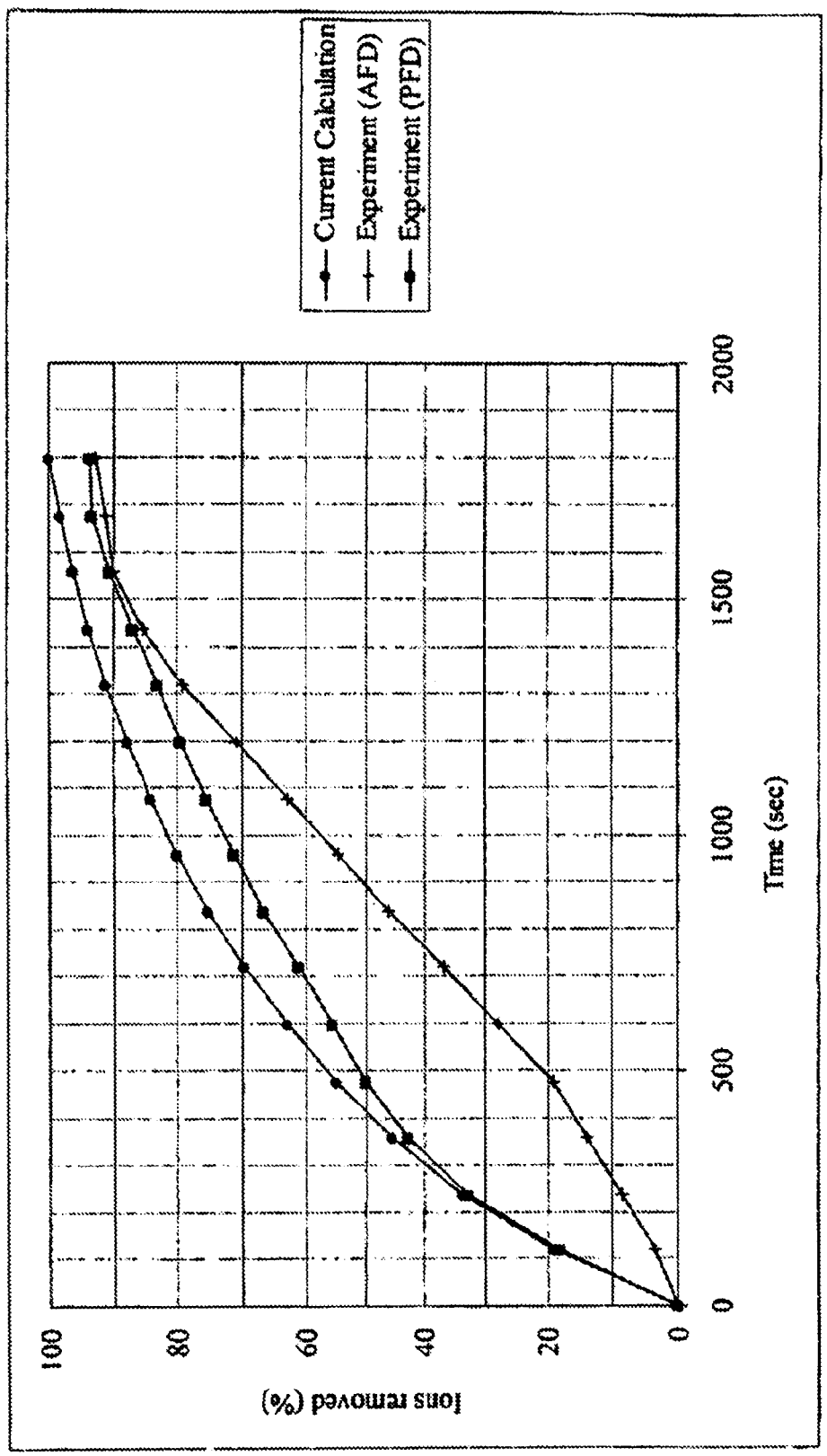
FIG. 13 plots the percentage of ions removed versus time for calculation and experimental results employing axial flow and permeating flow discharge.

Experimental results support the hypothesis that the permeating flow discharge process is able to regenerate electrodes in a more efficient manner than the conventional, axial flow discharge process, in a sense that the permeating flow discharge process does not exhibit significant time lag while axial flow discharge process does. The top-most graph in FIG. 13 is the electrostatic desorption curve and serves to show the best possible performance that can be derived from any mass transfer process. With increasing time, both processes are eventually able to fully discharge and transfer the ions out of the setup. This is indicated in FIG. 13 by two curves converging at t~1500 seconds. However, the advantage of the permeating flow discharge process comes from the fact that it is superior to the axial flow discharge process in the early to mid phases of discharging phase. FIG. 13, illustrates that the time taken to transfer 50% of the ions for axial flow discharge is around the 900s mark, whereas the corresponding value for permeating flow discharge is 480s. Thus, in regenerating the electrode to half of its full capacity one can accrue a time saving of nearly 50% with respect to the axial flow discharge process. This drastic improvement can change the water recovery ratio considerably.

Figure 14:
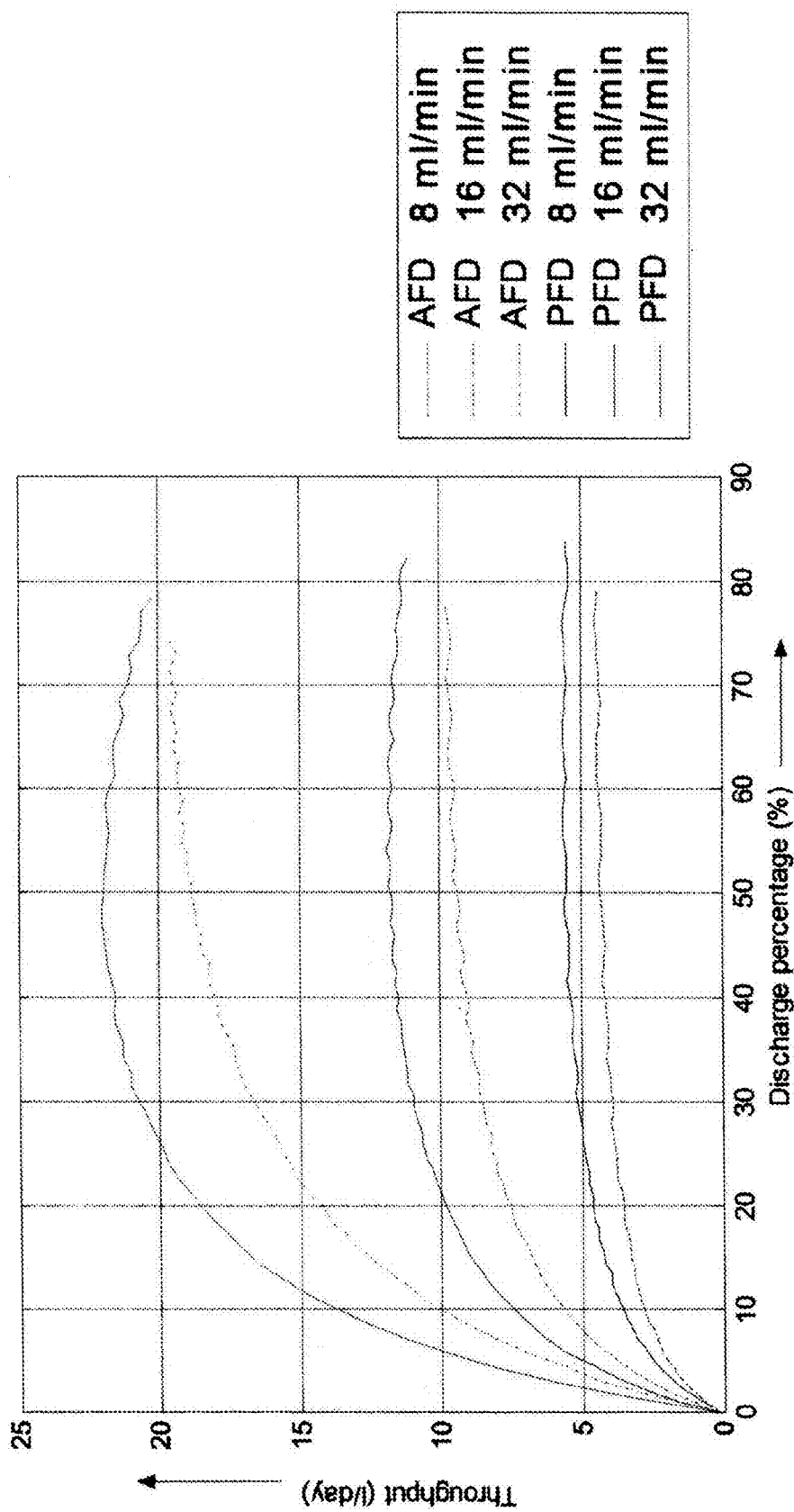
FIG. 14 plots throughput versus discharge percentage for various flow rates of axial flow and permeating flow discharge.

FIG. 14 is a plot of throughput as a function if discharge percentage for different flow rates of the AFD and PFD processes. FIG. 14 reveals the usefulness of the PFD process. It predicts a 37.5 percent, 20 percent and 18.4 percent improvement in throughput for the PFD process as compared to the AFD process for 8 ml/min, 16 ml/min and 32 ml/min flow rates respectively. We note here that the comparisons have been made for the best case to best case situation, which means we compare the maximum throughput possible for a given PFD flow rate and the corresponding value for the same AFD flow rate, irrespective of where (at which value of discharge percentage) the maximum of each process occurs. Thus we can confidently state that no matter how well the AFD process performs, we can always operate the PFD process to give a 20-35 percent higher throughput, given our system and flow parameters. Again, this is not a strict upper bound and possibly one can raise the bar even further. Nevertheless, this signifies a substantial improvement and one can readily visualize that these performance metrics will have a huge bearing on the feasibility of the process on a commercial scale. If we say that a nominal 25 percent improvement in water recovery ratio can be obtained on top of the optimal 50-60 percent values for axial flow discharge, the net water recovery ratio can be pegged at 75-85%, which is comparable to the figures of merit for RO and EDR plants.

This figure raises hopes in a different direction as well. It is typically considered that CDI is a desalination methodology most appropriate for brackish water treatment. The reason for that is, apart from the insufficient surface area of the fabricated capacitive electrodes till date, too much water is wasted having to discharge or regenerate electrodes when one is charging with high concentration input water. For example, if a given setup can desalinate 10 liter of water, having 1000 ppm concentration, it can only produce a maximum of 1 liter throughput per cycle, for input water having 10000 ppm concentration. Now the water needed to regenerate the electrodes remains constant because the same number of ions has been adsorbed in both cases onto the EDL of the electrodes. Let us say the amount of water required to flush out the ions is 10 liter. Given this scenario, one is using up 20 liter of 1000 ppm water to produce 10 liter of acceptable water, which is acceptable. However, for 10000 ppm water, one is wasting 9 liter of water to produce a meager 1 liter of throughput, which is completely unacceptable. While we do not predict that utilization of the PFD process can cause a direct improvement from a 3000 ppm brackish water feed to a 35000 ppm seawater feed, which can only be accomplished by having a much higher surface area electrode, we estimate that a reasonable increase in the input concentration, mirroring the increase in water recovery ratio, is feasible by such an approach.

The main benefits that arise from employing solvent drag, (a permeating based flow path in this illustrative embodiment) include: The permeating flow discharge occurs much faster, given the same flow rate of water through the system, thereby enhancing the water recovery ratio of the process. Putting it another way, we can obtain substantial saving in amount of water used to discharge the high surface area electrodes by reducing the flow rate in the system while keeping the time required to discharge the papers to a certain value, say 50% of its total capacity, constant. The permeating flow path is a decoupled design and is, thus, able to achieve the functions independently rather than compromising on any one function, as is the case with the axial flow discharge.

Another critical drawback of the existing capacitive deionization technology is that it can be used to desalinate relatively low concentrations of salt water only. Permeating flow discharge provides a viable method to enhance the water recovery ratio to acceptable levels for higher salinity water. By using this method, one could eliminate the bottleneck associated with the ability to recover water thereby paving the way for capacitive deionization to ably handle brackish and even sea water.

Recycling waste water has been mentioned as a method of improving the water recovery ratio in several desalination plants. However, the ability to discharge the capacitive electrodes efficiently goes down with each cycle (thereby adversely affecting time requirements). In addition, the pumping costs associated with recycling the water are substantial in a number of cases. Nevertheless, in order to meet the demands of the industry, the capacitive deionization process could be subjected to limited cycling of the discharging water. Even in such a case, permeating flow discharge is able to regenerate the electrodes faster because, unlike the axial flow process, it is not diffusion limited. In the axial flow case, once the concentration gradient between the electrode surface and the discharging water becomes sufficiently small the process stops. However, for permeating flow discharge, the process is convection dominated where gradients in concentration do not affect the functioning of the process.

The foregoing description of specific embodiments of the invention has been presented for the purposes of illustration and description. It is not intended to be exhaustive or to limit the invention to the precise forms disclosed, and many modifications and variations are possible in light of the above teachings. For example, concentric pipe arrangements with the pipes being composed of or lined with high surface area materials such as carbon aerogels may be employed. A shell-tube setup, analogous to a shell tube heat exchange, having one large outer cylinder within which multiple (e.g., two) concentric pipes with the space in between carrying the processed water and the innermost tube carrying the waste stream and the outer stream carrying waste water merged from all the individual concentric pipes are also contemplated within the scope of the invention. Moving electrodes could be employed for continuous operation, with the portions of two belts facing one another operating as the active electrodes and the portions of the belts facing away from each other being discharged by solvent drag. The embodiments were chosen and described to best explain the principles of the invention and its practical application, and to thereby enable others skilled in the art to best utilize the invention. It is intended that the scope of the invention be limited only by the claims appended hereto.

We claim:

1. A method comprising the steps of:
    applying a potential across porous electrodes;
    passing source water through a channel between the porous electrodes in an axial direction to deionize the source water with the potential applied across the porous electrodes;
    adjusting the potential across the porous electrodes; and
    with the potential adjusted across the porous electrodes, discharging the ions adsorbed to the porous electrodes from the source water by permeating a solvent through the pores of the porous electrodes in a permeating direction at a flow rate of at least 16 ml/minute that removes ions in the pores of the electrodes via a process of solvent drag.

2. The method of claim 1 further comprising the step of discharging ions adsorbed to the electrode through a process of diffusion.

3. The method of claim 1 further comprising the step of deionizing water in a batch process.

4. The method of claim 1 further comprising the step of deionizing water in a substantially continuous process.

5. The method of claim 1 wherein the step of altering the potential comprises neutralizing the potential across the electrodes.

6. The method of claim 1 wherein the step of altering the potential comprises reversing the potential across the electrodes.

7. The method of claim 1, wherein the solvent is selected from the source water and a waste water product from the deionization of the source water.

8. The method of claim 1, wherein the porous electrodes have a porosity greater than 50%.

9. The method of claim 1, wherein the permeation of the solvent through the porous electrodes is achieved by creating a pressure difference across the porous electrodes.

10. A method comprising the steps of:
    flowing source water including dissolved ions through a central channel formed between two permeable electrodes in an axial direction;
    applying a charge potential to the permeable electrodes to capacitvely deionize the source water in the central channel, wherein ions from the source water are adsorbed to the charged permeable electrodes;
    adjusting the charge potential to the permeable electrodes; and
    with the charge potential to the permeable electrodes adjusted, elevating the pressure within the central channel to flush a solvent from the central channel through the permeable electrodes in a permeating direction, removing the ions from the permeable electrodes via a process dominated by solvent drag in an electrode discharge step, wherein the pressure differential is sufficient for the solvent to transfer ions from the permeable electrodes via flow in the permeating direction at a rate that is at least an order of magnitude higher than a rate at which the solvent transfers ions from the permeable electrodes in the axial direction.

11. The method of claim 10 wherein each electrode comprises a carbon aerogel material.

12. The method of claim 10 wherein each electrode comprises a carbon nanotube material.

13. The method of claim 10 further comprising the step of altering the potential across the electrodes during the electrode discharge step.

14. The method of claim 13, wherein the step of altering the potential comprises neutralizing the potential across the electrodes.

15. The method of claim 13, wherein the step of altering the potential comprises reversing the potential across the electrodes.

16. The method of claim 10, wherein the solvent is selected from the source water and a waste water product from the deionization of the source water.

17. The method of claim 10, wherein the permeable electrodes have a porosity greater than 50%.

* * * * *